United States Patent [19]

Petzow et al.

[11] Patent Number: 5,081,078
[45] Date of Patent: Jan. 14, 1992

[54] SINTERABLE CERAMIC POWDER, PROCESS FOR ITS PREPARATION, SILICON NITRIDE CERAMIC MANUFACTURED THEREFROM, PROCESS FOR ITS MANUFACTURE AND ITS USE

[75] Inventors: Guntor Petzow, Tannenweg; Ralf Riedel, Kasparswaldstraße; Martin Seher, Neuhauser Straße; Marcellus Peuckert; Martin Brück, both of Hofheim am Taunus; Thomas Gerdau, Eppstein/Taunus; Hans-Jerg Kleiner, Kronberg Taunus; Tilo Vaahs, Kelkheim; Fritz Aldinger, Rodenbach, all of Fed. Rep. of Germany

[73] Assignee: Hoechst Aktiengesellschaft, Frankfurt am Main, Fed. Rep. of Germany

[21] Appl. No.: 443,881

[22] Filed: Nov. 30, 1989

[30] Foreign Application Priority Data

Dec. 3, 1988 [DE] Fed. Rep. of Germany ....... 3840773

[51] Int. Cl.$^5$ .............................................. C04B 35/58
[52] U.S. Cl. ........................................ 501/97; 501/98; 264/65
[58] Field of Search ............................ 556/460; 528/37; 428/428; 264/65, 66; 501/97, 96, 88, 92, 90g35

[56] References Cited

U.S. PATENT DOCUMENTS

| | | | |
|---|---|---|---|
| 3,853,567 | 12/1974 | Verbeck | 106/44 |
| 4,184,882 | 1/1980 | Lange | 501/92 |
| 4,482,669 | 11/1984 | Seyferth et al. | |
| 4,482,689 | 11/1984 | Haluska | 528/25 |
| 4,535,007 | 8/1985 | Cannady | 428/428 |
| 4,595,775 | 6/1986 | Arkles | 501/88 |
| 4,720,532 | 1/1988 | Sayferth et al. | 556/410 |
| 4,757,035 | 6/1988 | Baney | 501/97 |
| 4,767,876 | 8/1988 | Seyferth et al. | 556/410 |
| 4,800,182 | 1/1989 | Izaki et al. | 501/92 |
| 4,833,107 | 5/1989 | Kaya et al. | 501/96 |
| 4,847,345 | 7/1989 | Takamizawa et al. | 501/97 |
| 4,861,532 | 8/1989 | Haluska | 264/65 |
| 4,869,854 | 9/1989 | Takeda | 264/65 |

OTHER PUBLICATIONS

Science, vol. 208, May 23, 1980, "High Temperature Structural Ceramics", Katz, pp. 841-846.
Chem. Abstracts—"61-15005" Jul. 9, 1986, Production of Alpha Type Silicon Nitride Ishigoro et al.
Saiki, G. et al., Chem. Abs. 108: 172382r (1988).
Saiki, G. et al. (II) Chem. Abs. 108: 172384t (1988).
Schwartz, K. B. et al., Advanced Ceramic Materials 3, 320-323 (1988).
Saiki, G. et al. (III) Chem. Abs. 110: 14358n (1989).

Primary Examiner—William R. Dixon, Jr.
Assistant Examiner—Paul Marcantoni
Attorney, Agent, or Firm—Connolly & Hutz

[57] ABSTRACT

The invention relates to a novel sinterable ceramic powder, to its preparation, to its processing to form silicon nitride ceramic and to said material itself and its use. The sinterable ceramic powder is prepared by dissolving the polysilazane of formula (I)

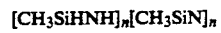

$$[CH_3SiHNH]_n[CH_3SiN]_n$$

where n is about 10 to 12, in an organic solvent, suspending a pulverulent sinter aid in this solution and then evaporating the solvent and pyrolyzing the residue in an inert gas atmosphere at 500° to 1600° C.

The resulting ceramic powder can be used to form a shaped article and then to manufacture silicon nitride ceramic by sintering. It is also possible, however, to form a shaped article from the as yet unpyrolyzed residue obtained after evaporation of the solvent, and then to pyrolyze and sinter said article.

The ceramic obtained can be used to manufacture components subject to high mechanical, thermal and corrosive stress.

15 Claims, No Drawings

SINTERABLE CERAMIC POWDER, PROCESS FOR ITS PREPARATION, SILICON NITRIDE CERAMIC MANUFACTURED THEREFROM, PROCESS FOR ITS MANUFACTURE AND ITS USE

DESCRIPTION

The invention relates to a novel sinterable ceramic powder, to its preparation, to its processing to form silicon nitride ceramic, and to said material itself and its use.

Pure $Si_3N_4$ can generally be compacted to the theoretical density at 1850° C. without the application of pressure, or at higher temperatures with the application of pressure, in each case with the addition of oxidic sinter aids such as aluminum oxide, silicon oxide, magnesium oxide or yttrium oxide.

By contrast, the complete compaction of mixed $Si_3N_4$/SiC powder proves substantially more difficult and can normally be achieved only by hot press molding.

A good reproducibility of the mechanical and physical properties of disperse materials depends essentially on the homogeneous distribution of the individual phases in the structure. Uniform distribution of both the disperse phase and the sinter aids generally presents major difficulties in the conventional manufacture of mixed ceramics from pulverulent $Si_3N_4$, SiC and sinter aids, and requires costly processes for mixing and grinding the appropriate powder mixtures. Processes are therefore being sought which ensure an improved distribution of the different particles in the initial powders.

One possible way of improving the homogeneity of the distribution of two or more phases is to deposit the sinter aids on to a ceramic powder, for instance SiC powder, from a solution phase. This is done by first dispersing e.g. SiC powder in a suspension agent in which sinter aids are already dissolved in the form of salts, metal-organic compounds or inorganic polymers. The dissolved sinter aids are then precipitated on to the SiC particles, for example by stripping off the solvent (DE 28 56 593 C2). The sinter aids are subsequently converted into the appropriate ceramic phases by thermal decomposition.

One object of the present invention consists in providing a process which ensures the synthesis of a sinterable $Si_3N_4$ or $Si_3N_4$/SiC powder in which both the $Si_3N_4$ and SiC particles and the sinter aids are extremely well distributed.

This object is achieved according to the invention by using a polymeric compound containing Si, C, H and N, namely an organically substituted polysilazane, as the source of $Si_3N_4$ and SiC and precipitating it on to a pulverulent sinter aid. This is followed by pyrolysis.

Accordingly, the present invention relates to a process for the preparation of a sinterable ceramic powder which comprises dissolving the polysilazane of formula (I)

$$[CH_3SiHNH]_n[CH_3SiN]_n$$

where n is about 10 to 12, in an organic solvent, suspending a pulverulent sinter aid in this solution and then evaporating the solvent and pyrolyzing the residue in an inert gas atmosphere at 500° to 1600° C.

The polysilazane used can be prepared according to U.S. Pat. No. 4,482,669 in the following manner:

1. Ammonolysis of $CH_3HSiCl_2$ to give trimeric and tetra meric cyclic silazanes $[CH_3SiHNH]_{3,4}$ 2. Crosslinking of the cyclic silazanes to give poly silazanes with the aid of basic catalysts such as KH:

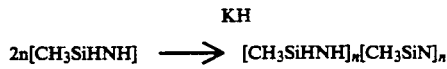

$$2n[CH_3SiHNH] \xrightarrow{KH} [CH_3SiHNH]_n[CH_3SiN]_n$$

The polysilazane synthesized in this way is obtained as a colorless solid, has molecular weights of between 1000 and 1300 g/mol and is soluble in organic solvents. It is preferred to use tetrahydrofuran (THF), toluene or hexane.

One or more of the following substances: alkaline earth elements, Al, Y, rare earth elements, Ti, Zr, Hf, Nb, Ta and Cr, in the form of their oxides, alcoholates, nit rates, acetates, acetylacetonates, carbonates, oxalates or halides, are generally used as sinter aids. The oxides of Mg, Al, Y, Dy, Ho, Er, Tm, Yb, Ti, Zr and Hf are preferred among said substances. The oxides of Mg, Al, Y, Yb and Ti are especially preferred.

The amount of sinter aids if preferably 0.02 to 0.2 mol per 100 g of polysilazane.

The polysilazane is first dissolved in an organic solvent. The pulverulent sinter aid is suspended in this solution. An ultrasound treatment of the suspension can then be carried out to improve the dispersion of the solid particles. Slow evaporation of the solvent at normal pressure or under a negative pressure causes the polymer to deposit homogeneously on to the solid particles. The resulting residue is then pyrolyzed in an inert gas atmosphere at 500°-1600° C., preferably 800°-1200° C. The inert gas used is preferably $N_2$, Ar, $NH_3$, $H_2$ or a mixture of these gases, in particular $N_2$, Ar, $NH_3$ or mixtures thereof.

The resulting ceramic powder can be used to manufacture $Si_3N_4$ or $Si_3N_4$/SiC sintered compacts by grinding the powder in an aprotic solvent, screening the ground product if necessary, forming a shaped article therefrom and sintering said article.

Therefore, the invention further relates to a process for the manufacture of a silicon nitride ceramic which comprises dissolving the polysilazane of formula (I)

$$[CH_3SiHNH]_n[CH_3SiN]_n$$

where n is about 10 to 12, in an organic solvent, suspending a pulverulent sinter aid in this solution, then evaporating the solvent, pyrolyzing the residue in an inert gas atmosphere at 500° to 1600° C., grinding the pyrolysis product in an aprotic solvent, forming a shaped article from the ground product and sintering said article at 1700°-2000° C. in an $N_2$ atmosphere at 1 to 150 bar.

It is also possible, however, to manufacturer an $Si_3N_4$ or $Si_3N_4$/SiC sintered compact by initially following the same procedure as for the preparation of the ceramic powder according to the invention, but instead of pyrolyzing the residue obtained after evaporation of the solvent, forming a shaped article therefrom first and then pyrolyzing and sintering said article.

Therefore, the invention further relates to a process for the manufacture of a silicon nitride ceramic which comprises dissolving the polysilazane of formula (I)

$[CH_3SiHNH]_n[CH_3SiN]_n$ where n is about 10 or 12, in an organic solvent, suspending a pulverulent sinter aid in this solution, then evaporating the solvent, forming a shaped article from the residue, pyrolyzing said article in an inert gas atmosphere at 500° to 1600° C. and then sintering it at 1750° to 2000° C. in an $N_2$ atmosphere at 1 to 150 bar.

In both ways of manufacturing a silicon nitride ceramic, the sintering is preferably carried out at 1700°–1850° C. in an $N_2$ atmosphere at 1–10 bar.

The maximum SiC content of the pyrolyzate which is to be expected on the basis of the elemental composition of the polysilazane is 22% by weight if the entire N content reacts to give $Si_3N_4$. In the case of pyrolysis under Ar or $N_2$ up to 1000° C., however, elemental carbon is also formed. This reacts, at the higher temperatures which are applied especially in the subsequent sintering step, with part of the initially produced $Si_3N_4$ to form SiC and $N_2$. For this reason, the sintered compacts manufactured by means of pyrolysis under Ar or $N_2$ have SiC contents of more than 22% by weight, the maximum being 43% by weight. On the other hand, if the polysilazane is pyrolyzed under an $NH_3$ atmosphere, pure $Si_3N_4$ is formed. In this way, SiC contents of between 0 to 43% by weight in the $Si_3N_4$/SiC sintered compacts can be obtained according to the choice of pyrolysis atmosphere ($NH_3$, $N_2$, $H_2$, Ar or mixtures thereof).

A characteristic feature of the structure of the $Si_3N_4$/SiC composite is that the particle growth of the $Si_3N_4$ matrix is strongly inhibited because of the dispersed SiC particles. The $Si_3N_4$ particles have an elongate shape with diameters of less than 1 μm and a length-to-diameter ratio of 5:1 to 10:1. The mean diameter of the approximately equiaxial SiC particles is less than 0.8 μm.

The sinterable ceramic powder prepared according to the invention contains 40–55% by weight of Si, 0.05–25% by weight of C, 10–35% by weight of N, 5–15% by weight of O and 2–10% by weight of one or more of the elements Mg, Al, Y, Dy, Ho, Er, Tm, Yb, Ti, Zr and Hf, all said elements being homogeneously distributed in the powder particles and especially Si, C and N being bound in the form of amorphous material. The preferred elements among those present in addition to Si, C, N and O are Mg, Al, Y, Dy, Ho, Er, Tm, Yb, Ti, Zr and Hf. Mg, Al, Y, Yb and Ti are especially suitable, in particular in a content of 2–10% by weight in the sinterable ceramic powder.

It is also preferred to have a content of 5 to 25% by weight of C, which, as mentioned above, can be adjusted via the composition of the inert gas used during pyrolysis.

The silicon nitride ceramic manufactured according to the invention is very sense with a maximum porosity of 3%. It preferable consists of 10–60% by weight of crystalline SiC, 35–85% by weight of crystalline $Si_3N_4$ and 3–20% by weight of amorphous or partly crystalline phase between the particles, which contains the sinter additives and oxygen. The composition can again be controlled via the composition of the inert gas used during pyrolysis.

The silicon nitride ceramic according to the invention can be used for the manufacture of components subject to high mechanical, thermal and corrosive stress.

EXAMPLE 1

Preparation of a Sinterable Ceramic Powder

In a one-necked round-bottomed flask with cock, 80 g of the polysilazane $[CH_3SiHNH]_n[CH_3SiN]_n$ (n=10 to 12) were dissolved in 300 ml of THF under inert argon gas. 8.4 g of $Al_2O_3$ and 3.6 g of $Y_2O_3$ were suspended in this solution. After subsequent treatment with ultrasound, the THF was distilled off at room temperature and $10^{-2}$ mbar, with vigorous stirring. The reside obtained was then pyrolyzed under a stream of argon in a quartz tube with cock. The heating rate was 4 K/min up to 550° C. As decomposition occurs at this temperature, a holding time of 1 h was observed at this stage. The pyrolysis was brought to completion by heating the pyrolyzate to 1000° C. at a rate of 4 K/min and holding it at this temperature for 1 h. This gave a residue amorphous to X-rays, consisting of 85% by weight of pyrolyzate, 10.5% by weight of $Al_2O_3$ and 4.5% by weight of $Y_2O_3$ and having the following composition (in % by weight) as determined by elemental analysis: Si (51.0%), C (12.4%), N (19.4%), O (8.8%), Al (5.6%), Y (2.8%). The pyrolyzate obtained was ground for 3 h in n-hexane, thereby destroying the hard agglomerates formed during pyrolysis. The ground pyrolyzate had a mean particle size of 0.7 μm and a BET specific surface area of 17 $m^2$/g.

EXAMPLE 2

Manufacture of a Silicon Nitride Ceramic

The sinterable ceramic powder prepared according to Example 1 was screened (mesh width d=160 μm), compressed in the cold under isostatic conditions at 640 MPa and sintered. The compact (diameter=10 mm, height=12 mm) was sintered without the application of pressure, under stationary nitrogen, at a heating rate of 20 K/min up to 1750° C. and with a holding time of 1 h. A simultaneous dilatometer recording showing that no further compaction occurred above 1750° C. The density of the sintered product was 3.2 g/$cm^3$, corresponding to 97% of theory assuming a theoretical density of 3.33 g/$cm^3$. Determination of the C content by elemental analysis showed a proportion of 23% by weight of SiC in the sintered $Si_3N_4$/SiC compact. The structure of the composite had mean particle sizes of 0.4 μm. The maximum particle sizes were ca. 1 μm.

What is claimed is:

1. A process for the preparation of a sinterable ceramic powder which comprises dissolving the polysilazane of formula (I)

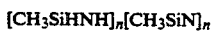

$[CH_3SiHNH]_n[CH_3SiN]_n$ where n is about 10 to 12, in an organic solvent, suspending a pulverulent sinter aid in this solution, then evaporating the solvent at a rate which causes the polysilazane to deposit homogeneously on to the pulverulent sinter aid particles and pyrolyzing the resulting residue in an inert gas atmosphere at 500° to 1600° C.

2. A process for the manufacturer of a silicon nitride ceramic which comprises dissolving the polysilazane of formula (I)

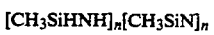

$[CH_3SiHNH]_n[CH_3SiN]_n$ where n is about 10 to 12, in an organic solvent, suspending a pulverulent sinter aid in this solution, then evaporating the solvent at a rate which causes the polysilazane to deposit homogeneously on to the pulverulent sinter aid particles, pyrolyzing the resulting residue in an inert gas atmosphere at 500° to 1600° C., grinding the pyrolysis product in an aprotic solvent, forming a shaped article from the ground product and sintering said article at 1700°-2000° C. in an $N_2$ atmosphere at 1 to 150 bar.

3. A process for the manufacture of a silicon nitride ceramic which comprises dissolving the polysilazane of formula (I)

$[CH_3SiHNH]_n[CH_3SiN]_n$ where n is about 10 to 12, in an organic solvent, suspending a pulverulent sinter aid in this solution, then evaporating the solvent at a rate which causes the polysilazane to deposit homogeneously on to the pulverulent sinter aid particles, forming a shaped article from the resulting residue, pyrolyzing said article in an inert gas atmosphere at 500° to 1600° C. and then sintering it at 1700° to 2000° C. in an $N_2$ atmosphere at 1 to 150 bar.

4. A process as claimed in claim 2, wherein the sintering step is carried out at 1750° to 1850° C. in an $N_2$ atmosphere at 1 to 10 bar.

5. A process as claimed in claim 1, wherein the pyrolysis step is carried out at 800° to 1200° C.

6. A process as claimed in claim 1, wherein toluene, hexane or THF is used as the solvent for the polysilazane.

7. A process as claimed in claim 1, wherein one or more of the elements Mg, Al, Y, Dy, Ho, Er, Tm, Yb, Ti, Zr and Hf, in the form of their oxides, alcoholates, nitrates, acetates, acetylacetonates, carbonates, oxalates or halides, are used as sinter aids.

8. A process as claimed in claim 7, wherein one or more of the elements Mg, Al, Y, Yb and Ti are used in the form of their oxides.

9. A process as claimed in claim 8, wherein 0.02 to 0.2 mol of the sinter aid is used per 100 g of polysilazane.

10. A process as claimed in claim 1, wherein $N_2$, Ar, $NH_3$ or a mixture of these gases is used as the inert gas during pyrolysis.

11. A sinterable ceramic powder obtained by the process as claimed in claim 1 and comprising 40-55% by weight of Si, 0.05-25% by weight of C, 10-35% by weight of N, 5-15% by weight of O and 2-10% by weight of one or more of the elements Mg, Al, Y, Dy, Ho, Er, Tm, Yb, Ti, Zr and Hf, all said elements being homogeneously distributed in the powder particles and Si, C and N being bound as amorphous material.

12. A sinterable ceramic powder comprising 40-55% by weight of Si, 0.05-25% by weight of C, 10-35% by weight of N, 5-15% by weight of O and 2-10% by weight of one or more of the elements Mg, Al, Y, Dy, Ho, Er, Tm, Yb, Ti, Zr and Hf, all said elements being homogeneously distributed in the powder particles and Si, C and N being bound as amorphous material.

13. A sinterable ceramic powder as claimed in claim 11,
comprising 2-10% by weight of one or more of the elements Mg, Al, Y, Yb and Ti.

14. A sinterable ceramic powder as claimed in claim 11,
comprising 5 to 25% by weight of C.

15. A machine component subject to high mechanical, thermal and corrosive stress, consisting essentially of a dense silicon nitride ceramic with a maximum porosity of 3%, said ceramic consisting essentially of 10-60% by weight of crystalline SiC, 35-85% by weight of crystalline $Si_3N_4$ and 3 to 20% by weight of amorphous or partly crystalline phase between the particles, which contains the sinter additives and oxygen, said ceramic being obtained by the process as claimed in claim 2.

* * * * *